United States Patent [19]

Rogers et al.

[11] Patent Number: 4,864,140

[45] Date of Patent: Sep. 5, 1989

[54] COINCIDENCE DETECTION SYSTEM FOR POSITRON EMISSION TOMOGRAPHY

[75] Inventors: W. Leslie Rogers; Neal H. Clinthorne; Gary D. Hutchins, all of Ann Arbor, Mich.

[73] Assignee: The University of Michigan, Ann Arbor, Mich.

[21] Appl. No.: 91,205

[22] Filed: Aug. 31, 1987

[51] Int. Cl.$^4$ .............................................. G01T 1/172
[52] U.S. Cl. ..................................... 250/369; 250/366
[58] Field of Search ................ 250/369, 366; 364/414, 364/571, 413.26, 413.15

[56] References Cited

U.S. PATENT DOCUMENTS 4,103,161  7/1978  Thomasson .......................... 364/571
4,568,829  2/1986  Ruckebush ........................... 250/256

OTHER PUBLICATIONS

Williams et al., "Design . . . Positron Emission Computed . . . Tomograph" IEEE Trans. Nucl. Scien. vol. NS-26 #1 (Feb., 1979) p. 619.

Primary Examiner—Carolyn E. Fields
Assistant Examiner—Richard Hanig
Attorney, Agent, or Firm—Rohm & Monsanto

[57] ABSTRACT

An arrangement for determining the most likely interaction time corresponding to an observed pulse in a system having statistical processes is provided with a timing arrangement for producing a plurality of timing signals, the timing signals having a predetermined time relationship with respect to one another. A plurality of sampling elements, each having an input for receiving a respectively associated signal vector to be sampled in accordance with at least one of the timing signals, and an output for producing an associated portion of an analog vector signal are additionally provided. A digital memory stores data corresponding to a plurality of weighting coefficient vectors, the weighting coefficient vectors being formed of values corresponding to a predetermined characteristic of the shape of the pulse event and at least one of the statistical processes. Product-forming circuitry produces product signals corresponding to products of the composite analog vector signal and respective one of the plurality of weighting coefficient vectors. The product signals are summed and compared in a threshold crossing detector which detects a threshold crossing of the sum signal.

15 Claims, 5 Drawing Sheets

COINCIDENCE DETECTION SYSTEM FOR POSITRON EMISSION TOMOGRAPHY

BACKGROUND OF THE INVENTION

This invention relates generally to systems which detect simultaneity of events, and more particularly, to a detection system which performs a Maximum Likelihood Estimation (MLE) of a pulse arrival time, the system being particularly adaptable to high energy physics and positron emission tomography (PET).

The two most widely used systems for timing events, such as in positron emission tomography, are leading-edge timing and constant-fraction timing. In PET scanning systems, it is desired to identify the location of a positron source, particularly within the body of a living being, during medical diagnosis. This is achieved by detecting a pair of oppositely traveling gamma rays which are issued when a positron is annihilated by collision with an electron. The gamma rays are issued substantially in directions 180° from one another, and by detecting the locations of the two gamma rays, the position of the annihilation can be determined to lie along a line between the location of detected gamma rays. Such detection of the gamma rays is achieved by using a plurality of scintillation crystals, which may be formed of sodium iodide crystal, bismuth germanate (BGO), barium fluoride ($BaF_2$), etc. When the gamma rays interact with the scintillation crystals, a pulse of light is generated which is detected by one or more photomultiplier tubes (PMTs), which, subject to certain statistical processs, convert the light input into an electrical signal.

The accuracy with which one can determine the time difference between the detection of the two gamma rays determines the probability that the two gamma rays originated from a single positron decay, and not two nearly coincidental, but physically unrelated decays. Additionally, as the accuracy of the timing improves, illustratively to the order of a few hundred picoseconds, the relative distance of the positron decay from the two detectors can be estimated because the transit time of the two gamma rays depends upon the distances traveled to the respective detectors. When the output pulses from the two detectors arrive within a predetermined time interval, the pulses are deemed to be coincidental to a single positron decay.

In such systems, there is present a measure of timing uncertainty which results from a variety of factors. One such factor is that the light output from the scintillator crystal has a finite mean rise time and decay time. For any given light pulse there are departures from the mean pulse shape due to the statistical nature of the light emission process. These random variations in shape introduce random variations in the measured time of occurrence of the pulse which depend in part on the method used to measure the time of occurrence. In similar fashion, the photosensor has a finite mean rise time and fall time associated with each photoelectron. Furthermore, there is a transit time variation in PMTs which, in combination with other random effects, result in variations about a mean for the pulse rise time. This time uncertainty, which has been termed "jitter," can be further increased by noise on the detector signal, which can be generated by the detector or within its associated electronics. A further cause of timing uncertainty results from the fact that a wide range of pulse amplitudes are obtained from the scintillator crystal. Thus, input signals having the same rise time, but different amplitudes will cross a detector threshold value at different times after the time of origination of the event. The result is that the output pulse of the detector is caused to "walk" along the time axis. The lower the amplitude of the input signal relative to the threshold, the more pronounced this type of error becomes.

Leading-edge triggering is performed by sensing the pulse with a discriminator circuit which has a very low threshold. This type of a system generates a fast timing spike when the input pulse voltage exceeds the threshold. Thus, a principal objective of this known system is to detect the first few photons given off by the scintillator. This is the simplest type of system for deriving a timing signal, but is quite subject to the aforementioned time walk error especially in cases when the threshold is set much above the first electron level. The time walk error is exacerbated by the charge sensitivity of leading-edge discriminators. In essence, once an input signal crosses the discriminator threshold level, a further amount of charge is required to achieve triggering of the discriminating element. The amount of error generated by this additional energy requirement increases with increases in the rise rate of the input signals. Additionally, such charge sensitivity increases the effective threshold level of the discriminator, resulting in errors which are greater for input signals having steeper leading edge slopes.

Constant-fraction timing aims to generate a timing pulse when the input pulse exceeds a predetermined optimum triggering fraction of the input pulse height. This type of timing arrangement produces less time-walk than leading-edge timing. In constant-fraction timing, the input signal is delayed and a fraction of the undelayed input is subtracted, usually to produce a bipolar pulse. The zero-crossing is detected, such detection causing issuance of an output logic pulse. Timing walk resulting from variations in amplitude and rise time of the input signal are minimized by proper selection of the shaping delay. However, neither leading-edge triggering nor constant-fraction timing overcome completely the problems resulting from statistical variations in pulse shape. Additionally, neither system utilizes all of the information available in an optimal manner. Faster scintillations will give improved timing, but to date these materials have lower stopping power or possess considerable chemical properties. Even with faster scintillators, improved timing will be obtained if all the pulse information is optimally used.

It is, therefore, an object of this invention to provide a timing system having high accuracy for detecting the time of nuclear events.

It is another object of this invention to provide a system which provides high accuracy for detecting simultaneously emitted gamma rays resulting from positron decay.

It is also an object of this invention to provide a high accuracy timing system which can be implemented in PET scanning systems.

It is a further object of this invention to provide a timing system for PET which can achieve timing with sufficient accuracy to provide positron source location based on time-of-flight information.

It is additionally an object of this invention to provide a timing system which provides improvement over leading-edge triggering systems, including first electron timing systems.

It is yet a further object of this invention to provide a timing system which provides improvement over constant-fraction timing systems.

It is also another object of this invention to provide a timing system which provides improvement over conventional amplitude-and-rise-time-compensated timing.

It is yet an additional object of this invention to provide a timing system which provides improvement over conventional true-constant-fraction timing.

It is still another object of this invention to provide a timing system which can be used in gamma-gamma correlation and detection systems which utilize scintillation crystals.

It is a yet further object of this invention to provide timing system which can be implemented using position estimating technology.

It is also a further object of this invention to provide a timing system wherein timing estimation is achieved using a correlation process.

It is additionally another object of this invention to provide a timing system which provides improvement over known arrangements with respect to input signals having variations in amplitudes.

A still further object of this invention is to provide a timing system which provides improvement over known arrangements in its ability to eliminate timing uncertainty resulting from time walking.

An additional object of this invention is to provide a system wherein spatial uncertainty of the location of a positron event is reduced.

Yet another object of this invention is to provide a system for inclusion in a PET scanning systems wherein the signal-to-noise ratio of the image is improved.

Another object of this invention is to provide a timing system for PET which can be incorporated into a multichannel system.

A yet further object of this invention is to improve the performance of PET imaging instruments with currently available phototubes and scintillators.

It is also an additional object of this invention to provide a system which improves the operation of PET instruments so as to establish a new set of boundary conditions for instrument optimization.

SUMMARY OF THE INVENTION

The foregoing and other objects are achieved by this invention which provides an arrangement for determining the maximum likelihood estimate of the timing of an event which occurs as a pulse in a system having statistical processes. In accordance with the invention, the arrangement is provided with a timing arrangement for producing a plurality of timing signals, the timing signals having a predetermined time relationship with respect to one another. A plurality of sampling elements, each having an input for receiving a respectively associated signal vector to be sampled in accordance with at least one of the timing signals, and an output for producing an associated portion of a composite analog vector signal are additionally provided. An alternate embodiment includes a timing means for producing a plurality of analog signals having a predetermined time relationship to one another. The invention is further provided with a memory, which may be a digital memory in certain embodiments, for storing data corresponding to a plurality of weighting coefficient vectors, the weighting coefficient vectors being formed of values corresponding to a predetermined characteristic of the shape of the pulse event and at least one of the statistical processes or a single realization of the shape of a pulse event. Product-forming circuitry is provided in the system for forming product signals corresponding to products of at least a portion of the composite analog vector signal and at least portions of respective ones of the plurality of weighting coefficient vectors.

In a specific illustrative embodiment of the invention, the arrangement is further provided with a summer for producing a summing signal responsive to a summation of the product signals. Additionally, a comparator coupled to the summer is provided for comparing the summing signal to a predetermined threshold value. In one specific embodiment, the predetermined threshold value is zero and the comparator is a zero crossing detector for detecting a zero crossing of the summing signal.

In another specific embodiment, the predetermined threshold can be a bias signal which compensates for certain imperfections in the measurement system. Corrections for unsampled portions of the pulse, which can include build-up of long time-constant pulse components, can be made at this time.

The product-forming circuitry, in one embodiment of the invention, is formed of a four-quadrant multiplying digital-to-analog converter having a first input coupled to the sampling elements for receiving at least a portion of the composite analog vector signal. There is further provided a second input coupled to the memory for receiving at least a portion of one of the plurality of weighting coefficient vectors in digital form, and an output for providing at least one of the product signals. A maximum detector is coupled to the plurality of sampling elements for detecting a one of the sampling elements issuing at the output a maximum value portion of the composite analog vector signal.

A memory range controller which is provided for controlling a range of operation of the memory is responsive to the maximum input. The memory range controller includes, in certain embodiments, a priority encoder coupled to each of the inputs for producing a digital signal responsive to the detected one of said sampling elements issuing the maximum value portion of the composite analog vector signal. A start address table is coupled to the memory for providing a starting address of the range of operation of the memory. Also, an end address table is coupled to the memory for providing an ending address of the range of operation of the memory. A memory step size controller is provided for controlling a first step size applied in the range of operation of the memory, and for converting to a second step size applied in a further range of operation of the memory, the conversion being responsive to the comparator. Preferably, the product signals produced by the product-forming circuitry correspond to a multiple-term product.

In a further aspect of the invention in a scintillation detection arrangement having plural time-related statistical processes for issuing an electrical pulse in response to a detected emittance from an emittance event, the invention provides an arrangement for producing a maximum likelihood estimation of the timing of the detected emittance event. The arrangement is provided with a plurality of sensors arranged in a predetermined configuration with respect to one another, each for detecting the emittance impinging thereon from the emittance event and for producing at an associated output thereof a respective sensor signal having a sensor signal value which is substantially responsive to the emittance event. A memory is provided for storing data corresponding to a plurality of weighting coefficient values corresponding to a predetermined characteristics of the shape of the electrical pulse and the statistical processes or of a single realization of the shape of the pulse event. Additionally, the invention provides in this combination product-forming circuitry for forming product signals corresponding to products of at least a portion of each of the sensor signals, each of the portions of the sensor signals having a predetermined time relationship with respect to other portions of the sensor signals, and respective ones of the plurality of weighting coefficient values.

In a specific illustrative embodiment, the arrangement is provided with a summer for producing a summing signal responsive to a summation of the product signals. Also, a comparator is coupled to the summer for comparing the summing signal to a predetermined threshold value. As previously indicated, the predetermined threshold value is zero in one embodiment, and the comparator comprises a zero crossing detector for detecting a zero crossing of the summing signal.

In accordance with a further aspect of the invention, a system processes scintillation pulses received at a fast rate from a plurality of detectors. This is achieved using a time expansion arrangement which is provided with an input for receiving respectively associated ones of the scintillation pulses from at least one of the detectors, and an output for producing output pulses corresponding to received ones of the scintillation pulses at a slower rate. An arithmetic combiner is provided with an input for receiving the output pulses, circuitry for combining timing information corresponding to the output pulses with a weighting value corresponding to a time-dependent statistical process which occurs in the formation of the scintillation pulses, and an output for producing an output signal corresponding to a combination of the timing information and the weighting value. In addition, threshold circuitry for comparing the output signal to a predetermined threshold value is also provided.

In one embodiment, the time expansion arrangement is formed with an analog memory having an input for receiving the scintillation pulses at a first rate of speed, memory locations for storing the scintillation pulses, and an output for issuing output signals corresponding to the scintillation pulses at a second rate of speed, which is slower than the first rate of speed. The acquisition of input information is controlled in response to a first clock which is coupled to the analog memory for governing a rate at which the analog memory produces input timing information corresponding to the scintillation pulses. The output of information is controlled in response to a second clock coupled to the analog memory for governing a rate at which the analog memory produces output timing information corresponding to the scintillation pulses.

In a preferred embodiment, the analog memory is triggered by a device which establishes a coincidence window. Also, system performance is improved by interposing a delay device between the detector and the analog memory for delaying a scintillation pulse from the detector.

In accordance with a method aspect of the invention, a time of detection of a gamma-ray emittance is determined by receiving a plurality of sensor signals from sensors having associated therewith respective time-dependent statistical processes which operate during production of the sensor signals. Each of the sensor signals has an associated sensor signal value responsive to the gamma-ray emittance. This step is followed by the step of combining the sensor signal values with respectively associated weighting factors to produce a plurality of weighted sensor signal values. In this step, the weighting factors have values selected in response to the time-dependent statistical processes. Subsequently, the values of the weighting factors are correlated with respectively associated timing information.

Simplified Model

In order to assess the advantages of the application of alternative timing estimators, a simplified model has been developed by the inventors herein describing the emission and photoelectric conversion processes of scintillation photons. From this model was derived the maximum likelihood estimator for the most probable gamma ray interaction time compared by computer simulation to leading edge threshold timing resolution.

The model assumes that the mean rate of photoelectron production in the photomultiplier tube resulting from a gamma-ray interaction, $t_a$, is given by the following biexponential relation:

$$\sigma(t - t_a) = \frac{N_0}{(\tau_d - \tau_r)} (e^{-(t-t_a)/\tau_d} - e^{-(t-t_a)/\tau_r}), \; t \geq t_a, \quad \text{Eq. 1}$$

where $N_0$ is the mean number of photoelectrons per scintillation, and $\tau_r$ and $\tau_d$ are the scintillator rise and decay time constants, respectively.

The use of this function assures that the leading edge and maximum likelihood estimators will not be influenced by either past scintillation events or thermionic emission from the photocathode. The emitted electrons are converted to an electric current using an idealized photomultiplier with non-random and invertible characteristics.

The photoelectron emission sequence, $m(t)$, can be represented as:

$$m(t) = \sum_{i=0}^{N(t)} \delta(t - t_i) \quad \text{Eq. 2}$$

where $t_i$, $i = 1, 2, \ldots$ are the photoelectron emission times, $\delta$ is a Dirac delta function, and $N(t)$ is a Poisson point process with the rate function given in Eq. 1. Under the above assumption that the response of the ideal photomultiplier can be inverted and the point process of photoelectron emission can be observed directly, the log-likelihood function for emission sequence given the time of gamma ray interaction, $t_a$, can be written as:

$$l(m(t)|t_a) = \int_0^\infty m(t) \ln \sigma(t - t_a) dt - \int_0^\infty \sigma(t - t_a) dt \quad \text{Eq. 3}$$

This is the objective function which must be maximized with respect to $t_a$ to determine the most probable time of gamma ray interaction. The second integral, on the right side of Eq. 3, is invariant with respect to $t_a$ and can be ignored for maximization purposes. The first integral is merely a correlation between the logarithm of the time shifted mean rate function and the observed photoelectron sequence.

A Monte-Carlo simulation was used to generate photoelectron emission data in 200 ps increments using the rate function of Eq. 1, with rise and decay time constants typical of BGO, 50 ps and 300 ns, respectively. The mean number of photoelectrons produced by each pulse was fixed at 200, indicating that all gamma-ray interactions were of the same type, illustratively photoelectric absorption. The single electron response of the non-random photomultiplier tube and associated processing electronics was assumed to be Gaussian in shape and had a width of 20 ns FWHM.

The single electron response was convolved with the photoelectron emission data to simulate the photomultiplier tube anode current. A simulated leading edge trigger was used to determine the time to the preset threshold crossing from the known time of gamma ray interaction, $t_a$. The log likelihood function was approximated by a finite sum of 200 ps increments and 2 $\mu$s in duration and the value $t_a$ corresponding to the global maximum of this function was used as the estimate of the interaction time.

The simulations resulted in a single channel FWHM time resolution of 4.3–5.3 ns FWHM for leading edge timing as the threshold was varied from 1% to 10% of the mean peak height of the output pulse. The time resolution of the maximum likelihood estimator was 2.0 ns FWHM. Since the maximum likelihood estimator is energy normalized, its performance is nearly the same when a spectrum of pulse heights is used. In contrast, the leading edge method performs poorly when a wide spectrum of pulse heights is employed due to the phenomenon of time walk.

Theoretical Development

In the application of estimation theory to the problem of coincidence timing, an improvement in the timing resolution by a factor of 2 can be achieved by maximum likelihood estimation of the gamma-ray interaction under the assumptions of:
1. perfect and noiseless observation of the photoelectron point process;
2. Poisson counting statistics with known intensity; and
3. post detection conditions.

It is therefore reasonable to expect that practical improvements in timing accuracy can be achieved through more realistic modeling of the measurement process and optimal detection and estimation of event time. In the following, a general framework for the acquisition of event time is described which takes into consideration most, if not all, of the physical attributes of the scintillation detector measurement procedure.

Although the following framework is applicable to other event-driven systems, such as those found in experimental particle physics, the following description is in the context of a positron annihilatio event in PET scanning systems. In PET, acquisition is a two-stage process, which includes the correct detection of a pair of gamma rays and the subsequent estimation of the differential time-of-flight of the gamma-ray pair. In a typical system, paired opposing scintillators respond to gamma rays by producing a large photon flux which is converted to an electrical current at the output of a photomultiplier tube. This electrical current forms the measurement process and drives the acquisition circuitry for subsequent signal processing and time estimation. However, accurate acquisition is hampered by a combination of the stochastic nature of the gamma-ray scintillation detector interactions and the effects of noise.

An incident gamma ray produces a photon emission through a total or partial exchange of energy to the scintillator lattice. The emitted photons form a stochastic point process evolving over both time and space. The photon intensity produced by an incident gamma ray is typically a pulse, the shape of which may depend on scintillator type, operating conditions such as temperature, and incident position.

Scintillation photons are converted to photoelectrons at the cathode of the photomultiplier tube. The photoelectrons are emitted at different points over the cathode surface with a distribution of energies, and experience different accelerating fields in their flight to the first dynode of the photomultiplier tube. This phenomenon is repeated between successive dynodes and the anode. The effect of these random interactions is time jitter which produces time spreading of the scintillator photon intensity function at the output of the photomultiplier tube, which necessarily degrades time estimator performance.

The scintillator lattice requires a certain amount of time to fall back into an equilibrium state following a gamma-ray interaction. This transient recovery time depends on the scintillator characteristics. Thus, at high gamma rates the photon intensity function will greatly depend upon elapsed time between successive events.

In addition to the immediate production of photons following a gamma-ray interaction, delayed fluorescence and phosphorescence phenomena can cause the scintillator to produce photons which are essentially unrelated to the gamma interaction. Combined with the photomultiplier tube's spontaneous thermionic emission of electrons, this constitutes a source of noise in the output response of the photomultiplier tube/scintillator unit.

Thermal Johnson noise is unavoidable in the electronic processing of signals following the photomultiplier tube. This noise can be modeled as Gaussian with a very broadband spectral density.

A general formulation for the PET signal acquisition problem which takes into consideration the foregoing physical effects and which expresses the outputs of two photomultiplier tubes, $X_1$ and $X_2$, over a time interval $[0,T]$, is as follows:

$$X_1(t) = \sum_{i=0}^{N_1(t)} p(t - t_i^1) + w_1(t) \qquad \text{Eq. 4}$$

$$X_2(t) = \sum_{j=0}^{N_2(t)} p(t - t_j^2) + w_2(t) \qquad \text{Eq. 5}$$

In Eqs. 4 and 5, $N_1$ and $N_2$ are point processes which model the photoelectric flux in the photomultiplier tube, p(t) is the single photon response function of the measurement circuitry, $t_i^1$ and $t_j^2$, i, j = 1, 2, ... are the arrival times of the output photoelectrons and $w_1$ and $w_2$ are uncorrelated thermal noise processes. In the model of Eqs. 4 and 5, a positron annihilation causes a joint increase in the photoelectric flux $N_1$ and $N_2$. It is this change in statistics of $N_1$ and $N_2$ that is to be detected and from which the time estimate must be extracted.

The present discussion is limited to leading edge timing. This method uses a simple threshold applied directly to the observed waveforms. In this method an annihilation is declared if both $X_1$ and $X_2$ exceed a preset threshold within an acceptable amount of time. In time-of-flight PET the elapsed time between the threshold crossing is then used as a differential time-of-flight estimate. Optimal detector/estimator systems for the change in $N_1$ and $N_2$ in Eqs. 4 and 5 can be derived under specific assumptions underlying the statistical distributions of these point processes.

A first model is a simple inhomogeneous Poisson model in which $N_1$ and $N_2$ are Poisson processes with intensity functions $g_1$ and $g_2$ of known functional form but with unknown parameters. In its simplest form, the intensities are given by:

$$g_1(t) = g_2(t) = g_0 \qquad \text{Eq. 6}$$

in the absence of a coincident positron annihilation, and $$g_1(t) = g_0 = \sigma_1(t - t_a) \qquad \text{Eq. 7}$$

$$g_2(t) = g_0 + \sigma_1(t - t_a - D) \qquad \text{Eq. 8}$$

when annihilation occurs at time $t_a$ with differential time-of-flight of D. Here, $g_0$ is the quiescent mean output of a scintillation detector unit, $\sigma_1$ and $\sigma_2$ are intensity functions associated with the mean response of the scintillation detector units to an incident gamma-ray. In general, D may be modeled either as a random variable, illustratively with uniform distribution, or as a non-random unknown constant. In the latter case, $N_1$ and $N_2$ are statistically independent, while in the former, they are correlated by the random variable D.

In a doubly stochastic Poisson model, $N_1$ and $N_2$ are modeled by Poisson processes, as described hereinabove, except that the mean scintillation detector response functions $\sigma_1$ and $\sigma_2$ contain random parameters. By careful choice of the distribution of these parameters, such a model can account for the statistical variability of the mean response of the scintillator as a result of gamma-ray interaction and time jitter.

In a self-exciting Poisson model, $N_1$ and $N_2$ have intensity functions $g_1$ and $g_2$ which are dependent upon the past history of the point process. Such a model can take into consideration the transient recovery time of the photomultiplier tube/scintillator, as discussed above. In a specific version of this model allows the single photon response of the circuit to depend only on the elapsed time from the most recent photon excitation.

For each of the foregoing models, the objective is to detect a joint increase in $g_1(t)$ and $g_2(t)$ of magnitude $\sigma_1(t - t_a)$ and $\sigma_2(t - t_a - D)$ for D in the admissible range of differential time-of-flight, and subsequently to estimate D.

BRIEF DESCRIPTION OF THE DRAWING

Comprehension of the invention is facilitated by reading the following detailed description in conjunction with the annexed drawing figures, in which.

DETAILED DESCRIPTION

Figure 1:
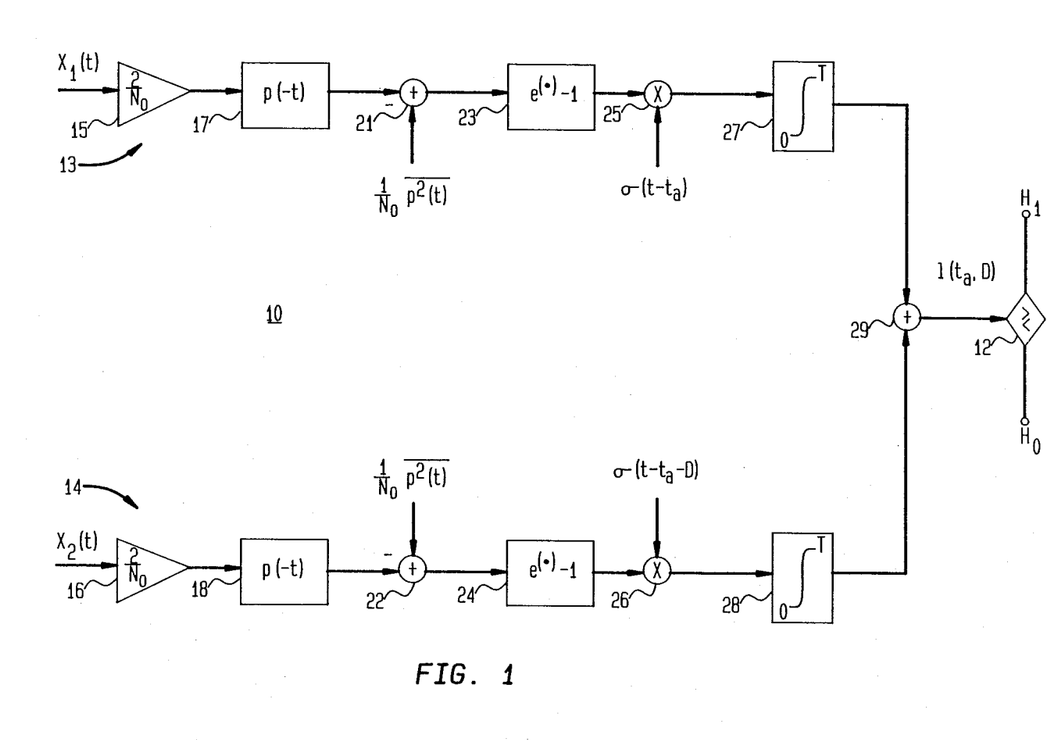
FIG. 1 is a block and line representation of an optimum detector of an annihilation which generates signals corresponding to a likelihood ratio test between two hypotheses: $H_0$: no coincidence and $H_1$: true coincidence.

FIG. 1 is a block and line representation of an optimum detector 10 of an annihilation at time $t_a$, with a differential time-of-flight D is essentially a threshold test on the log-likelihood function of $t_a$ and D, $l(t_a, D)$. A comparator 12 provides at respective outputs signals corresponding to a likelihood ratio test between two hypotheses: $H_0$: no coincidence (no annihilation) and $H_1$: true coincidence (annihilation), based on the value of $l(t_a, D)$.

In this particular system, it is assumed that the thermal noise is white with power spectral density of magnitude $N_0/2$. $X_1$ and $X_2$ are passed through respective branches 13 and 14 of the optimum detector, each of which performs matched filtering and correlation operations. The $X_i$ are passed through respective amplifiers 15 and 16, each having a gain $2/N_0$, and filters 17 and 18. Each such filter has an impulse response of $p(-t)$. The filters are matched and serve to separate the photon induced pulses from the thermal instrumentation noise.

Filters 17 and 18 are each coupled at their outputs to respective ones of summing elements 21 and 22. Each such summing element receives the output of its associated filter at a first input terminal, and at a second input terminal the summing elements receive a function corresponding to:

$$\frac{1}{N_0} \overline{p^2(t)}$$

The outputs of the summing elements are then each passed through an associated one of exponential-type nonlinearities 23 and 24. The nonlinearities correspond to $(e^{(\cdot)} - 1)$. Correlation to a time-shifted version of the photomultiplier tube/scintillator intensity $\sigma_i$ is performed at respective multipliers 25 and 26. The multipliers combine the outputs of the exponential nonlinearities with respective ones of $\sigma(t - t_a)$ and $\sigma(t - t_a - D)$. This correlation operation attempts to separate the annihilation induced photons from the random photon noise. After integration of the signals in respective integrators 27 and 28, which integrate from 0 to T, the signals are combined additively in a summing element 29. Finally, the sum of the branches is passed through comparator 12, which functions as a preset threshold device, and which declares a true coincidence only if the threshold is exceeded. The threshold is preset to achieve a given probability of false alarm. The system is optimal in the sense that the probability of correct detection is maximized. Additionally, this system can be implemented using only linear filters and memoryless nonlinearities, in a simple VLSI.

A system which is virtually identical to that of FIG. 1 can be constructed by persons skilled in this art, in light of the teaching herein, to perform maximum likelihood estimation by searching for the maximum of the log-likelihood function, $l(t^a, D)$ over all $t^a, D$. Although the maximum likelihood estimator is popular, it may not be particularly accurate. Indeed, the small sample statistics of the maximum likelihood estimator may be highly sensitive to outliers, i.e., rare but significant spurious noise peaks in the observations.

Figure 2:
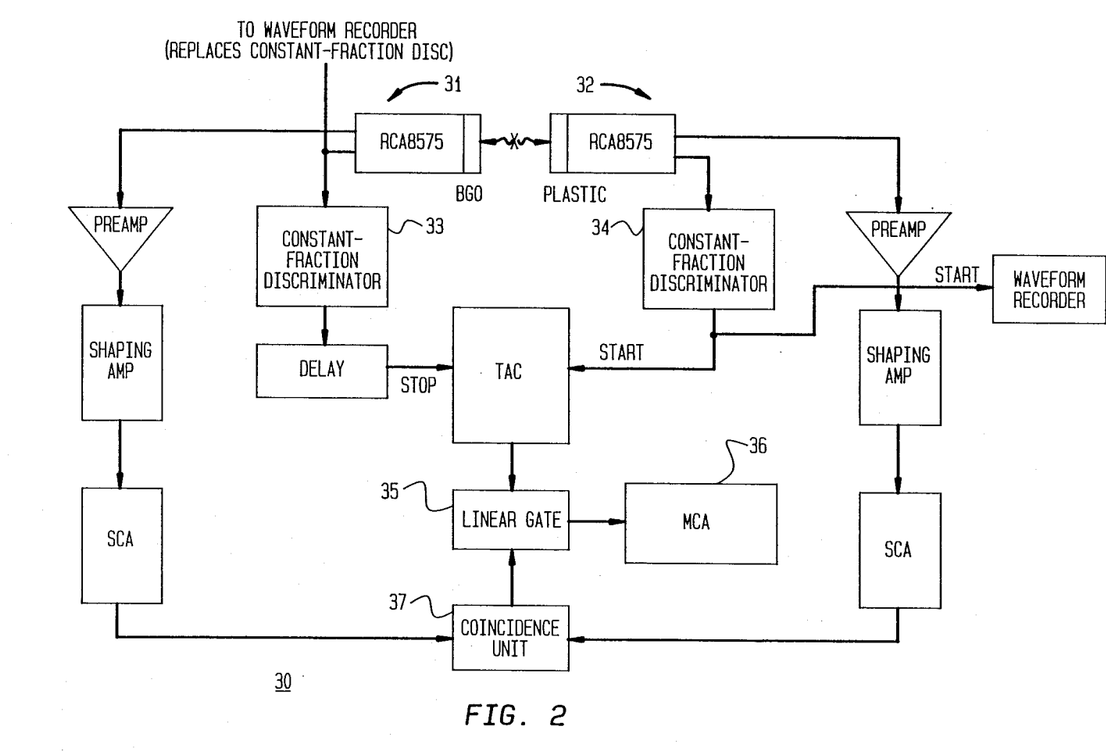
FIG. 2 is a block and line representation of a system which is useful for coincidence and time-of-flight measurements.

FIG. 2 is a block and line representation of a BGO/plastic coincidence measuring system 30 which is useful for coincidence and time-of-flight measurements, and is particularly useful for initial testing and calibration. Coincidence measuring system 30 is provided with a BGO channel 31, and a plastic channel 32 which serves as a low jitter timing reference for the coincidence measurements. In some embodiments, the BGO scintillator of the BGO channel can be replaced with a plastic scintillator. Such a fast plastic/plastic coincidence measuring arrangement is particularly useful in optimizing timing resolution of the reference channel.

Coincidence measuring system 30 can be used to make parameter measurements of the physical properties of the photomultiplier tube/scintillator unit and associated processing electronics. Thus, parameter measurements can be performed in situations where inter-device parameter variation is large, parameter specifications deviate significantly from the published literature or manufacturer's specifications, or if optimal estimator performance is highly sensitive to parameter variations.

In this specific illustrative embodiment, coincidence measuring system 30 utilizes circuitry which includes respective constant-fraction discriminators 33 and 34, one of which is delayed, to enable a linear gate 35. Linear gate 35 passes the processed outputs of the BGO and plastic channels to a multichannel recorder 36 via a coincidence unit 37.

Figure 3:
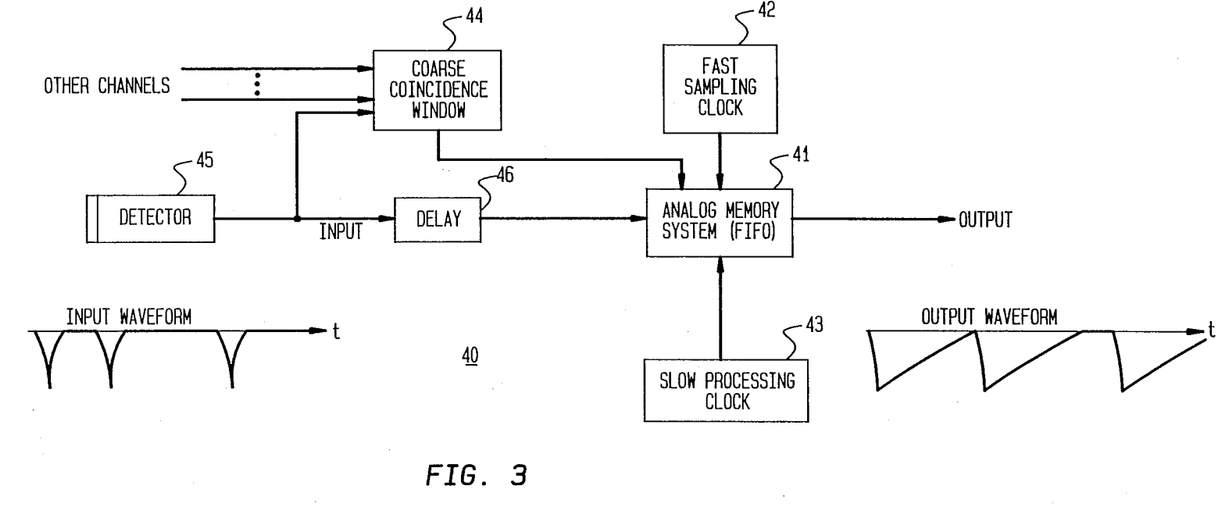
FIG. 3 is a block and line representation of a time expansion system.

FIG. 3 is a block and line representation of a time expansion system 40, the operation of which utilizes the fact that fast pulses resulting from coincident scintillations are, on the average, spaced in time relatively widely apart. Such pulses are of extremely short duration in PET, thereby excluding most known signal processing technologies from being useful in this application. Since the actual time in processing coincidence pulses in a PET scanner may be considerably longer than the length of the useful timing information in each pulse, it is an aspect of this invention that the scintillation pulses can be recorded at one sample rate and then played back and processed at a slower rate. This would permit a broad array of signal processing technologies to be usable in this application. For example, the time scale of a scintillation pulse could be expanded sufficiently to permit the use of charge coupled devices (CCDs) as finite impulse response (FIR) filters, or even operational amplifiers as active filters.

In the specific embodiment of FIG. 3, the fast scintillation pulses are captured at full speed by an analog memory system 41 of the first-in-first-out (FIFO) type, in combination with a fast sampling clock 42. The processing electronics of the time expansion system can then read out the scintillation pulses for processing at a slower rate of speed using a slow processing clock 43. In this manner, the scintillation pulses are expanded in their length to permit full utilization of the available processing time. The time expansion system is triggered by a coarse coincidence window 44 to prevent capture and processing of all events. The photomultiplier tube pulse, illustratively from detector 45, is delayed by a delay 46, then applied to the input of analog memory system 41.

Figure 4:
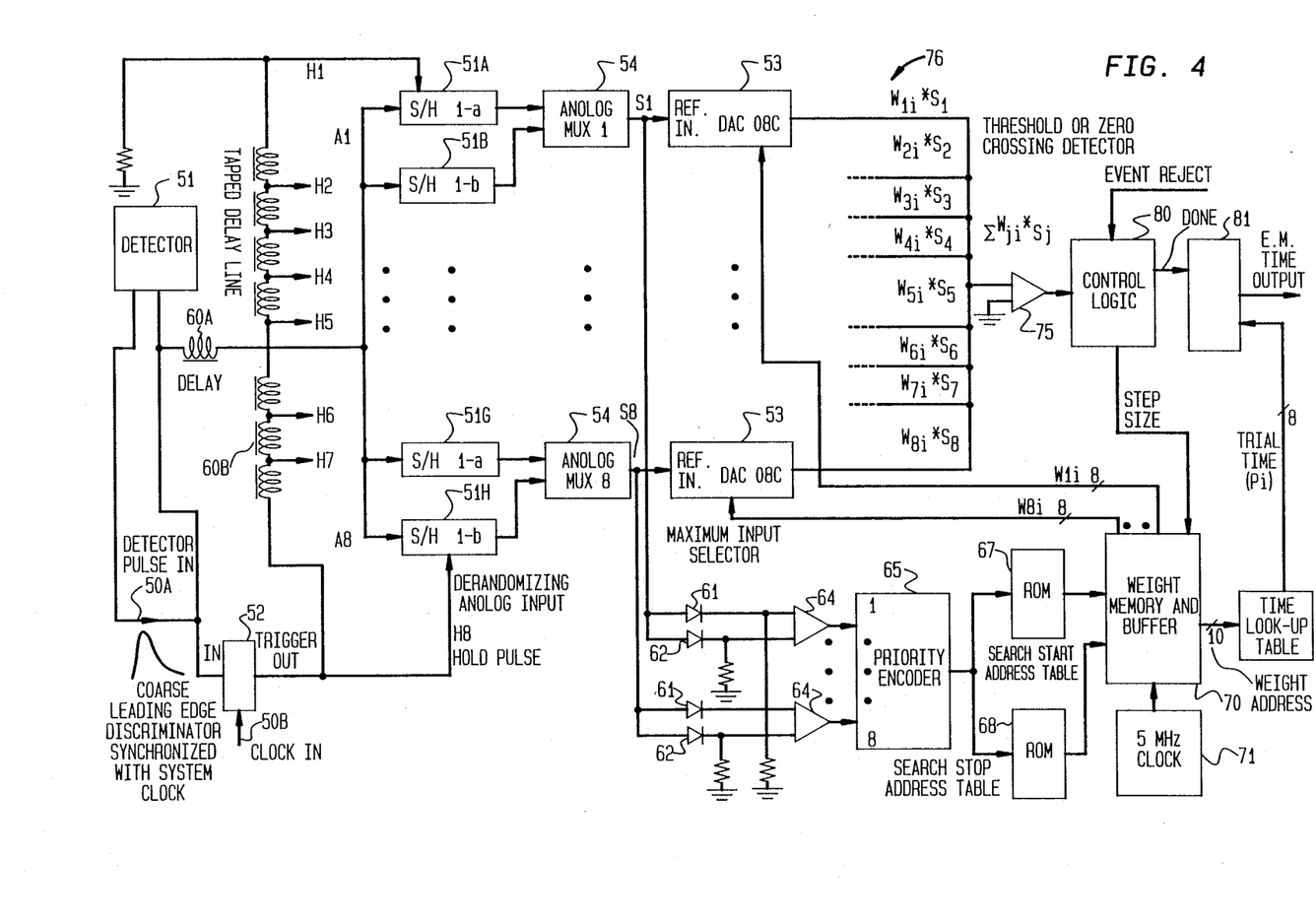
FIG. 4 is a block and line representation of a specific illustrative embodiment of the invention, wherein the trigger pulse is incrementally delayed.

FIG. 4 is a block and line representation of a specific illustrative embodiment of the invention. The circuit of FIG. 4 is used to compute the maximum likelihood estimation of the timing of each event.

In this embodiment, a detector input 50A receives a detector output pulse, illustratively from a detector 51, which may be of the leading edge type. A clock input 50B receives a clock signal. The clock signal and the detector output pulse are both conducted to a coarse leading edge discriminator 52, whereby the coarse leading edge discriminator is synchronized with the system clock (not shown). The leading edge discriminator is coupled at its output to respective input terminals H1 to H8 of sample-and-hold amplifiers 51A through 51H. In some embodiments of the invention, the sample-and-hold amplifiers are of the type known as Harris 5320.

In accordance with the invention, corresponding sample-and-hold amplifiers 51A-51H are each triggered at slightly different times so that a sampled version of the pulse waveform, after multiplexing at analog multiplexers 54, is subsequently conducted to the reference inputs of respectively associated maximum multiplying digital-to-analog converters 53. In this specific illustrative embodiment, each multiplying digital-to-analog converter 53 is a Signetics 4-quadrant 8-bit high-speed multiplying type. A single stage of analog buffering is therefore used to derandomize the input pulses.

In this embodiment, the triggering of sample-and-hold amplifiers 51A-51H at slightly different times is achieved by a plurality of delay lines. More specifically, the detector pulse is delivered to eight sample-and-hold amplifiers, 51A-51H, all simultaneously after a delay resulting from operation of a delay line 60A. However, the output of coarse leading edge discriminator 52 is applied to trigger the sample-and-hold amplifiers at slightly different times by operation of a tapped delay line 60B. Each of inputs H1—H8 of the sample-and-hold amplifiers is coupled to a different one of the tapped outputs of delay line 60B.

Figure 5:
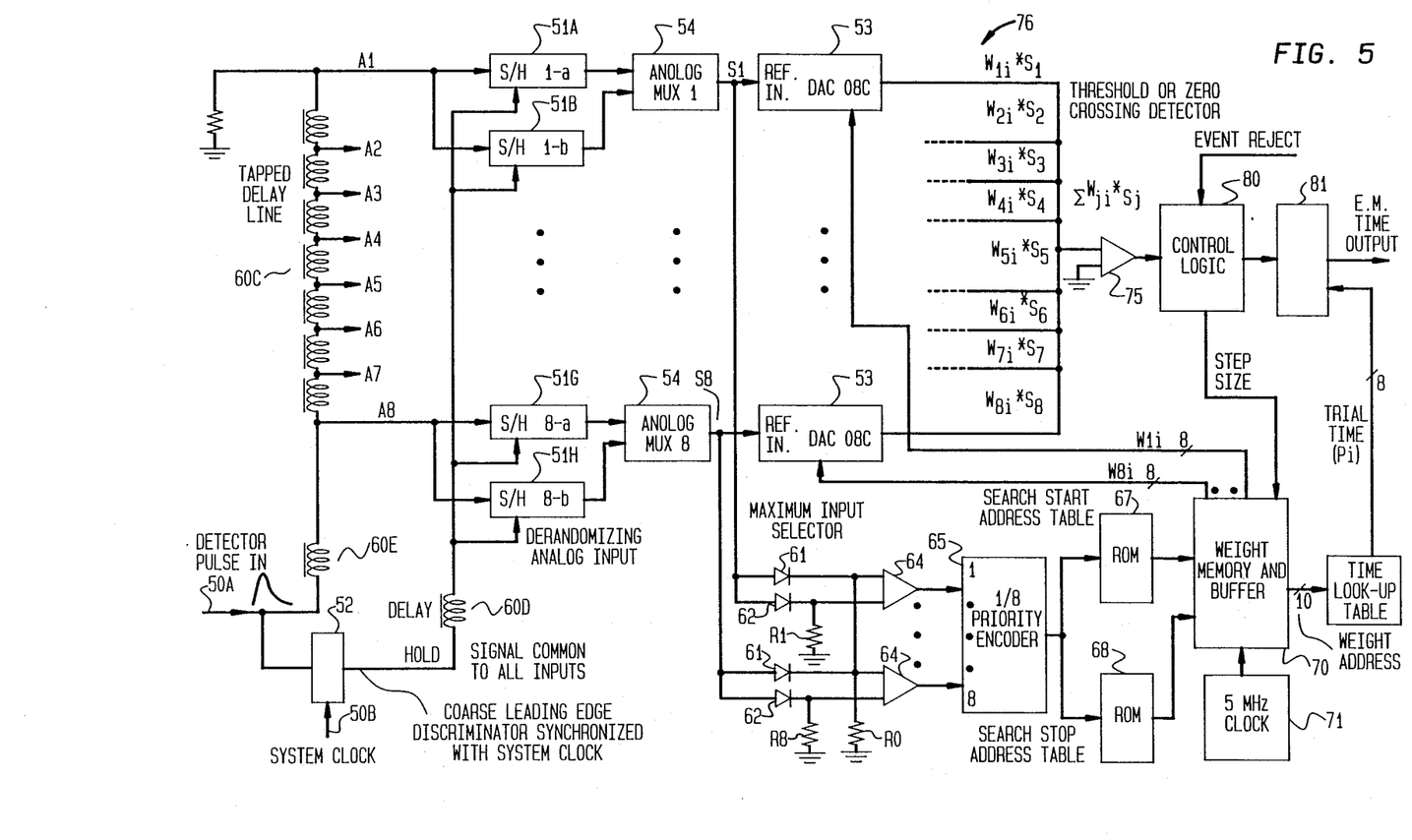
FIG. 5 is a block and line representation of a further specific illustrative embodiment of the invention, wherein the input detector pulse is incrementally delayed.

FIG. 5 illustrates an alternative embodiment of the invention in which the pulse waveform is incrementally delayed at each sample-and-hold input and the sample-and-hold amplifiers are all triggered simultaneously. More specifically, the input pulse is delivered to the sample-and-hold amplifiers at slightly different times by tapped delay line 60C. However, the triggering pulse from coarse leading edge detector 52 is applied to all of the sample-and-hold amplifiers simultaneously, after a delay caused by delay line 60D. Thus, in this regard, this embodiment is the reverse of the embodiment of FIG. 4. Also, in this specific illustrative embodiment of the invention, delivery of the input pulse to tapped delay line 60C is delayed by operation of a delay line 60E.

In FIGS. 4 and 5, the pulses coupled to the input terminals are stretched and subsequently are conducted to respectively associated ones of diodes 61 and 62 which are coupled at their cathodes to respective inputs of a respective comparator 64. The maximum of the eight input pulses, less the voltage drop across the respective ones of diodes 61, appears across resistor R0, and therefore at one input of all eight comparators 64 in this embodiment. Only for a channel with the maximum input voltage will both diodes 61 and 62 be conducting, and since the value of R0 is smaller than the values of resistors R1-R8, the voltage drop across the associated diode 61 of the pair will exceed the voltage drop across the associated diode 62. Thus, the corresponding comparator 64 will change states.

Comparators 64 are each connected at respective inputs of a priority encoder 65 which issues at its output a signal which identifies the particular one of comparators 64 which changed state. In this manner, the search for the maximum likelihood time can be confined to a small time interval near the most likely time by identifying the particular one of comparators 64 which is associated with the detector having the maximum input signal.

The output signal of priority encoder 65 causes a search start address to be selected from a ROM 67 and a search stop address to be selected from a ROM 68. These addresses are conducted to a weight memory 70 which contains memory locations for each of the eight inputs coupled to the detector. Once the start and stop addresses have been determined from ROMs 67 and 68, the weight values are clocked out in parallel to their respectively associated ones of multiplying digital-to-analog converters 53, in response to a clock 71. In this embodiment, the output currents of multiplying digital-to-analog converters 53 are each proportional to the weight being clocked into them and the summed output of certain ones of the detectors (not shown). The sum of these products is conducted to a zero crossing detector 75.

In accordance with this specific embodiment of the invention, the detector signals at the inputs of multiplying digital-to-analog converters 53 are transformed to respective weighted signals at the outputs thereof. The weighting functions are derived from the mean pulse waveform, and the statistical process which governs the pulse formation is sequentially clocked into the multiplying digital-to-analog converters. These weighted signals are then summed algebraically in summing network 76 which delivers to zero crossing detector 75 a summed, or composite, weighted detector signal. That set of weights which produces a zero crossing at the summed output of the multiplying digital-to-analog converters will correspond to the pulse maximum likelihood estimate of the arrival time relative to a reference clock pulse.

In order to save processing time in certain embodiments of the invention, the initial search can be conducted in a coarse step mode. When zero crossing is detected by zero crossing detector 75, a signal is conducted to a control logic system 80 which controls the step size of the increments in weight memory 70. Consequently, the step size is reduced, and the scan direction reversed to obtain a more precise location of the zero crossing. Scintillation events which do not satisfy a minimum energy criteria can be rejected by control logic 80. In addition, control logic 80 controls analog multiplexers 54, the system output at output register 81, and other system functions.

Although the invention has been disclosed in terms of specific embodiments and applications, persons skilled in the art can, in light of this teaching, generate additional embodiments without exceeding the scope or departing from the spirit of the claimed invention. Accordingly, it is to be understood that the drawing and description are proffered to facilitate comprehension of the invention and should not be construed to limit the scope thereof.

What is claimed is:

1. A system for determining the most likely interaction time corresponding to an observed event which occurs as a pulse in a system having statistical processes, the system comprising:

timing means for producing a plurality of analog vector signals having a predetermined time relationship with one another;

a plurality of sampling means, each having an input for receiving a respectively associated signal vector to be sampled in accordance with at least one of said timing signals, and an output for producing an associated portion of an analog vector signal;

memory means for storing data corresponding to a plurality of weighting coefficient vectors, said weighting coefficient vectors being formed of values responsive to a predetermined characteristic of the shape of the pulse event and at least one of the statistical processes; and product-forming means for forming product signals corresponding to products of at least a portion of said composite analog vector signal and at least portions of respective ones of said plurality of weighting coefficient vectors.

2. The system of claim 1 wherein there are further provided:

summing means for producing a summing signal responsive to a summation of said product signals; and comparison means coupled to said summing means for comparing said summing signal to a predetermined threshold value.

3. The system of claim 2 wherein said predetermined threshold value is zero and said comparison means comprises a zero-crossing detector for detecting a zero crossing of said summing signal.

4. The system of claim 1 wherein said product-forming means comprises a four-quadrant multiplying digital-to-analog converter having a first input coupled to said sampling means for receiving at least a portion of said composite analog vector signal, a second input coupled to said memory means for receiving at least a portion of one of said plurality of weighting coefficient vectors in digital form, and an output for providing at least one of said product signals.

5. The system of claim 1 wherein said predetermined characteristic of the shape of the pulse event is obtained from a single realization of said pulse event.

6. The system of claim 1 wherein said product-forming means comprises analog memory means and analog multiplier means, having a first input coupled to said sampling means for receiving at least a portion of said analog vector signal, a second input for receiving at least a portion of said plurality of weighting coefficient vectors in analog form, and an output for providing at least one of said product signals.

7. The system of claim 1 wherein there is further provided a leading edge detector for detecting a leading edge of said analog vector signal.

8. The system of claim 1 wherein there is further provided maximum detector means coupled to said plurality of sampling means for detecting a one of said sampling means issuing at said output a maximum value portion of said composite analog vector signal.

9. The system of claim 8 wherein there is further provided memory range control means for controlling a range of operation f said memory means responsive to said maximum detector means.

10. The system of claim 9 wherein said memory range control means comprises:

priority encoder means coupled to said maximum detector means for producing a digital signal responsive to said detected one of said sampling means issuing said maximum value portion of said composite analog vector signal;

address start means coupled to said memory means for providing a starting address of said range of operation of said memory means; and address end means coupled to said memory means for providing an ending address of said range of operation of said memory means.

11. The system of claim 9 wherein there is further provided memory step size control means for controlling a first step size applied in said range of operation of said memory means, and for converting to a second step size applied in a further range of operation of said memory means, said conversion being responsive to said comparison means.

12. The system of claim 1 wherein each of said product signals produced by said product-forming means corresponds to an eight-term product.

13. In a scintilaation detection apparatus having plural time-related statistical processes for issuing an electrical pulse in response to a detected emittance from an emittance event, a system for producing a maximum likelihood estimation of the timing of the detected emittance event, the system comprising:

a plurality of sensors arranged in a predetermined configuration with respect to one another, each for detecting the emittance impinging thereon from the emittance event and for producing at an associated output thereof a respective sensor signal having a sensor signal value which is substantially responsive to the emittance event;

memory means for storing data corresponding to a plurality of weighting coefficient values corresponding to a predetermined characteristics of the shape of the electrical pulse and the statistical processes; and product-forming means for forming product signals corresponding to products of at least a portion of each of said sensor signals, each of said portions of said sensor signals having a predetermined time relationship with respect to other portions of said sensor signals, and respective ones of said plurality of weighting coefficient values.

14. The system of claim 13 wherein there are further provided:

summing means for producing a summing signal responsive to a summation of said product signals; and comparison means coupled to said summing means for comparing said summing signal to a predetermined threshold value.

15. The system of claim 14 wherein said predetermined threshold value is zero and said comparison means comprises a zero-crossing detector for detecting a zero crossing of said summing signal.

* * * * *

UNITED STATES PATENT AND TRADEMARK OFFICE
CERTIFICATE OF CORRECTION

PATENT NO. : 4,864,140

DATED : September 5, 1989

INVENTOR(S) : W. Leslie Rogers, et al.

It is certified that error appears in the above-identified patent and that said Letters Patent is hereby corrected as shown below:

Column 1, between the title and the heading "Background of the Invention", please insert the following paragraph:

-- Government Rights

This invention was made with Government support under Grant No. 2R01 CA 32846 awarded by the National Cancer Institute of the National Institutes of Health. The Government has certain rights in the invention. -- ;

Col. 7, line 54, change "annihilatio" to -- annihilation --; and

Col. 9, Eq. 7, change "$g_1(t)=g_0=\sigma_1(t-t_a)$" to -- $g_1(t)= g_0 + \sigma_1(t-t_a)$ --.

Signed and Sealed this

Sixth Day of April, 1993

*Attest:*

STEPHEN G. KUNIN

*Attesting Officer*   *Acting Commissioner of Patents and Trademarks*